UNITED STATES PATENT OFFICE.

WILHELM GERBEL, OF RORSCHACH, SWITZERLAND.

PREPARATION OF FLOUR FROM CURD OF MILK.

SPECIFICATION forming part of Letters Patent No. 421,830, dated February 18, 1890.

Application filed July 11, 1889. Serial No. 317,223. (No specimens.)

*To all whom it may concern:*

Be it known that I, WILHELM GERBEL, a citizen of Switzerland, residing at Rorschach, Switzerland, have invented new and useful Improvements in Flour Prepared or Made from Curd of Milk, of which the following is a specification.

This invention relates to a new product which has the form of flour, and is produced from curd.

In carrying out my invention I remove the cream from sweet milk, treat the remaining liquid with rennet, and then separate the curd from the whey, as usually practiced in the manufacture of cheese.

The separation of the curd from the whey can be effected by pressure or by means of a centrifugal machine, and after the curd has been freed from the whey it is comminuted by suitable knives or cutters, and the comminuted mass is spread upon trays or hurdles, which are best made of sheet metal. The trays which contain the comminuted curd are then introduced into a kiln similar to those used for drying fruit, in which a uniform temperature is maintained of from 45° to 50° centigrade, and in which the comminuted curd is kept for about six hours, during which it is repeatedly turned over. After the lapse of about six hours the mass is left to cool for from six to nine hours, and then again exposed to a temperature of from 45° to 50° centigrade for about six hours, and then again left to cool, the same process being repeated until the mass is sufficiently dry and crisp, so that it can be reduced to a fine powder by grinding or other suitable means. If the product is intended for home use, it is sufficient to expose the comminuted curd three times in succession to the process of heating and cooling, as above stated; but if the product is intended for export or for use on ships it is best to repeat the heating and cooling process four or five times.

The operation of comminuting the dried mass can be effected by an ordinary grinding-mill.

The curd-flour, which is the result of the foregoing process, when perfectly dry is composed as follows:

| | |
|---|---|
| Fatty matter | 1.02 |
| Mineral substances | 7.17 |
| Proteids | 77.43 |
| Extracts free from nitrogen | 14.38 |
| | 100.00 |

That is to say:

| | |
|---|---|
| Digestible substances | 98.58 |
| Indigestible substances | 1.42 |
| | 100.00 |

I have also analyzed the product after the comminuted curd had been exposed to the heating and drying process, as above stated, only twice in succession, and the result of the analysis was as follows:

| | |
|---|---|
| Moisture | 10.23 |
| Fatty matter | 0.93 |
| Mineral substances | 6.51 |
| Proteids | 70.25 |
| Extracts free from nitrogen | 12.08 |
| | 100.00 |

That is to say:

| | |
|---|---|
| Digestible substances | 98.73 |
| Indigestible substances | 1.27 |
| | 100.00 |

My curd-flour remains inert until it is brought into the proper condition for raising its vitality, which is done, for instance, when it is mixed into a dough. For this reason the air-tight integuments needed for the preservation of similar products which are obtained by exposing milk to a high temperature *in vacuo* are not required for my curd-flour.

My flour can be used with great advantage for bread or other articles of a similar nature, and for this purpose I mix it with wheat or other flour in the proportion of about one part of curd-flour to two parts of wheat-flour.

I do not claim in this application for a patent the process for producing curd-flour, such being claimed in my application for a patent filed January 21, 1889, Serial No. 298,259.

What I claim as new, and desire to secure by Letters Patent, is—

As a new article of manufacture, the within-described flour prepared from curd, which appears in the form of a fine yellowish powder, and which in its dry state contains fatty matter, mineral substances, proteids, and extracts free from nitrogen, in about the proportions above set forth.

In testimony whereof I have hereunto set my hand and seal in the presence of two subscribing witnesses:

WILHELM GERBEL. [L. S.]

Witnesses:
CARL KLAIBER,
FRANGOTT BRUNNWHIRCKER.